Aug. 11, 1936.  L. E. COVER  2,050,247
LAMINATED INSULATING BLOCK AND METHOD OF FABRICATING THE SAME
Filed July 1, 1933
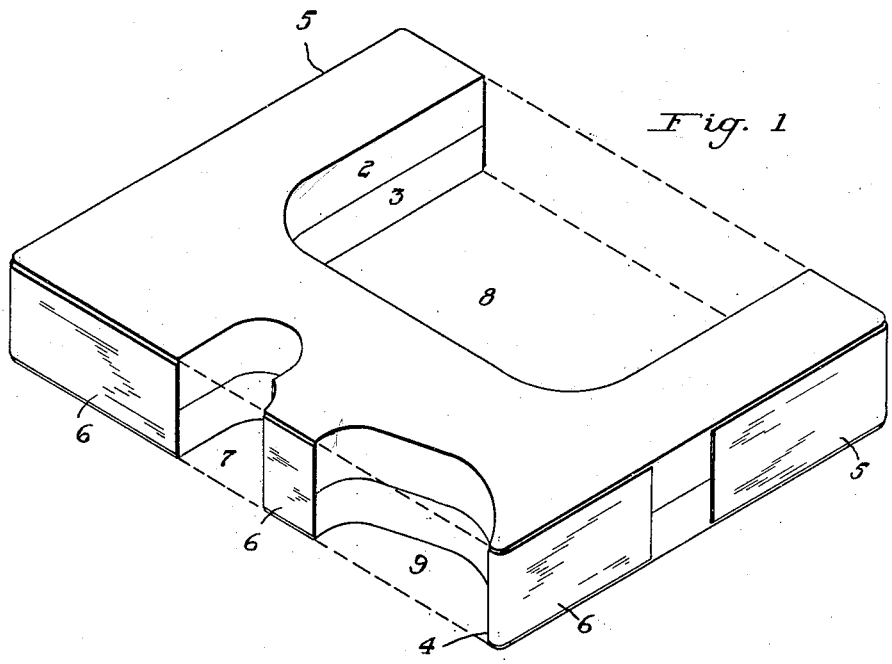
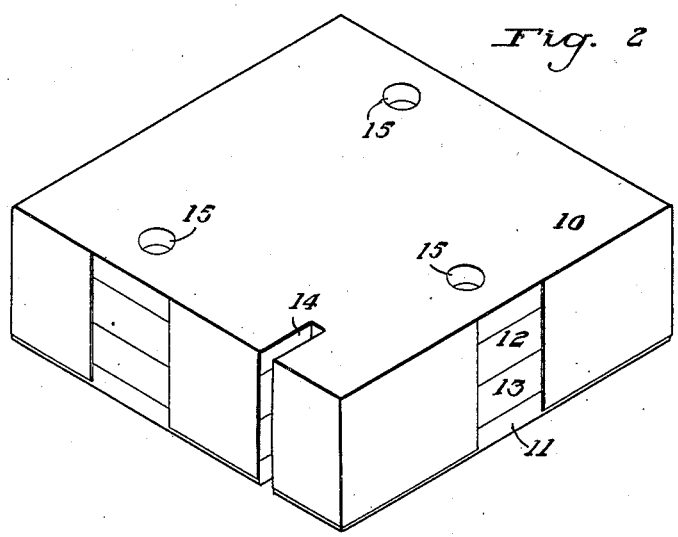
Inventor
Lester E. Cover
by
Walter F. Kaufman
Attorney Patented Aug. 11, 1936

2,050,247

UNITED STATES PATENT OFFICE 2,050,247

LAMINATED INSULATING BLOCK AND METHOD OF FABRICATING THE SAME

Lester E. Cover, Lancaster, Pa., assignor to Armstrong-Newport Company, Pensacola, Fla., a corporation of Delaware Application July 1, 1933, Serial No. 678,665

15 Claims. (Cl. 154—28)

This invention relates to laminated insulating blocks and method of making the same and more particularly to insulating blocks which are prefabricated with a complex contour for ready insertion into mechanical refrigerators and similar constructions requiring insulation blocks of irregular contour.

It has heretofore been proposed to insulate refrigerator cabinets by means of blocks of insulation material of standard size and shape, usually rectangular, and all cutting and fitting has been done by hand at the place of assembly. With the advent of production lines in mechanical refrigerator assembly it has been found essential to substitute preformed blocks for those commonly produced at the place of assembly. When corkboard is employed as the insulation, the common procedure is to contour molded blocks of the desired final thickness by means of wood-working tools. Corkboard, while it is an ideal insulation, is relatively expensive as compared with the fibrous insulating materials now on the market.

Modern day refrigerators are designed with particular reference to insulation efficiency and the insulation is generally 3" to 6" in thickness. It is difficult, if not commercially impracticable, to produce a fibrous insulating material of a thickness greater than 2". It is much more economical to produce insulating sheets of fibrous material of a thickness not greater than 1". Attempts have been made from time to time to mold fibrous insulating material into the desired final thickness but the insulating efficiency of the resultant block has not been satisfactory.

It is an object of my invention to provide an economical method for the manufacture of thick laminated fibrous insulating blocks which possess rigidity and are self-sustaining even after the original blank has been cut to a complex contour. It is a further object of my invention to provide an insulation blank which may be conveniently worked on wood working machines and after contouring will be sufficiently rigid and will be protected on its edges and corners to permit line production handling. It is a still further object of my invention to provide an insulation block of irregular contour which will possess rigidity and which will accurately fit into position.

According to my invention a plurality of flat, fibrous insulating units, each preferably possessing sufficient strength to be self supporting and of regular geometrical outline are superposed and placed under compression sufficient to cause adjacent faces of the units to contact with one another over substantially their entire surface area whereby any openings which would permit direct transmission of heat through the block are avoided. The individual insulating units are preferably all of the same width and length although they may be of varying thickness in order that a flat, regular peripheral surface will be provided for the reception of a securing web which is adhesively secured to a portion at least of the periphery of the blank. While the sheets are under compression, the securing web of thin, flexible material is adhesively secured to the periphery of the blank and after setting of the adhesive, the pressure is released and the blanks are machined on wood working machinery.

In order that my invention may be more readily understood, I will describe the same in connection with the accompanying drawing in which, Figure 1 is an isometric view of an insulating block for use in a mechanical refrigerator; and Figure 2 is a similar view of an insulating block of different contour.

A blank is first formed by superposing a plurality of self-sustaining, resilient fibrous insulating units. These units should preferably be of a regular geometric shape. As illustrated by the dotted lines in Figure 1 the units in the illustration were rectangular before shaping. The number of units employed will depend upon the desired final thickness of the insulation block. In the embodiment illustrated in Figure 1, two units 2 and 3 are used, each unit being of substantially the same thickness. The units are laid in face to face contact with one another with the peripheral edges of the units forming a flat regular surface. The blocks are placed under sufficient pressure to compress the units so that substantially the entire surface area of the adjacent faces are in contact. I have found that an ordinary hand screw press is sufficient for this purpose. While the blocks are maintained under compression, a sheet of thin, flexible, readily severable material is adhesively secured to the periphery of the units. I prefer to use a gummed kraft paper since it is conveniently rendered adhesive by merely moistening the gummed portion and further because the adhesive sets up rapidly and it is not necessary to maintain the units in the press for an extended period of time. If desired, a fabric sheet or sheets may be used in which event they should preferably be heavily sized in order to permit cutting operations which may be subsequently employed. The adhesive employed should be one that does not harbor mold and should preferably be quick setting in order that the material may be removed from the press after a short period of time. A thermoplastic adhesive may be employed. For convenience in application of the tape it is preferable that it be of a width slightly less than the combined thickness of the compacted units in order that it may be rapidly applied without the difficulty of trimming off edges which might be exposed if the sheet were not accurately positioned. The confining sheet should be sufficiently wide to engage and securely hold all of the units in position.

The sheet material should preferably be applied to the salient corners, in order to prevent breakage thereof upon handling, and at any place where the block will be of greatly reduced section as at 4 in Figure 1. I prefer to use two sheets of paper 5 and 6, which sheets extend over the four corners of the blank. If desired, however, a single sheet may be used and wrapped around the entire periphery or a number of small pieces of sheet material may be placed at strategic points. The securing sheet should be so positioned with respect to the final contouring that sufficient of the sheet material will remain that the units will be held against relative movement subsequent to the final shaping operations. The blocks are maintained in the press until the adhesive has set sufficiently to permit their removal, after which they are contoured to the desired final shape.

In Figure 1 there is shown a block suitable for use in a mechanical refrigerator. This block is provided with an opening 7 through which a supply pipe passes into the main body of the cabinet. This opening 7 may be conveniently formed on a routing machine or may be drilled. An opening 8 is formed in the blank by means of a band saw in order that the block may fit around the compressor unit which may extend rearwardly of the cabinet. A curved opening 9 is also provided which may be routed out or cut by a band saw. This cut out portion 9 leaves the upstanding portion 4 which would normally possess very little structural strength. It will be noted, however, that the paper layer 6 serves as a reenforcement for the portion 4 and prevents breakage thereof.

After all machining operations have been performed on the periphery of the blank, the blank may be reduced to the desired final thickness after which machining operations may be performed on the exposed faces. The blocks may be sanded or ground to the final thickness or they may be sawn or otherwise reduced. On large production jobs it is convenient to produce the insulating units of such thickness that upon lamination the resulting blank is of the desired final thickness.

Fibrous insulating boards are generally produced in ½" and 1" thicknesses and in sheets 4' wide and of indefinite length. There is considerable scrap attendant to such manufacture and it often happens that sheets of relatively large surface area are available for laminated constructions of the kind referred to. Heretofore such scrap material has been destroyed. These scrap sheets may be cut to the desired geometrical shape from scrap pieces which would not be large enough for use in house insulation, for example, wherein sheets 4'x10' are employed.

In Figure 2, I have illustrated a similar construction in which the outside or face layers 10 and 11 are formed of relatively denser material than the inner insulating layers 12 and 13. The dense outside faces permit more accurate machining and serve to strengthen and reenforce the insulating portion. The layers 10 and 11 are preferably made of insulating material but as mentioned above are somewhat denser than the layers 12 and 13. The block illustrated in Figure 2 is not as complicated in contour as the block illustrated in Figure 1. It is provided with a slotted opening 14 which may be formed in the board by means of a dado head or may be routed. There are a number of openings 15 which are drilled in the surface of the face sheet and are adapted to receive the heads of bolts which are on the inner side of the refrigerator crock and serve to support the compressor unit.

While in the drawing there is illustrated blanks in which the edges join the faces at right angles, it will be understood that if a taper is desired on one or more edges this taper may be provided on the individual units prior to attaching the confining tape.

While I have described certain preferred embodiments of my invention, it will be understood that the invention may be otherwise embodied and practiced within the scope of the following claims.

I claim:

1. In the method of fabricating laminated fibrous insulation blocks, the steps consisting in superposing a plurality of self-sustaining, resilient fibrous insulating units to form a blank of approximately the desired final thickness and general geometrical outline, placing said units under compression sufficient to cause adjacent faces of the units to contact with one another throughout substantially their entire surface area, maintaining said units under compression while adhesively securing thin, flexible, readily severable sheet material to sufficient of the periphery of said blank to maintain said insulating units as a block upon subsequent fabrication and thereafter releasing said pressure and cutting away portions of the blank.

2. In the method of fabricating laminated fibrous insulation blocks, the steps consisting in superposing a plurality of self-sustaining, fibrous insulating units to form a blank of substantially the desired final thickness and general geometrical outline, adhesively securing a thin, flexible, readily severable sheet material to sufficient of the periphery of said block and including the salient portions thereof, to maintain said insulating units as a block upon subsequent fabrication, and cutting away portions of the blank, said sheet material maintaining said units in fixed relative position subsequent to cutting and protecting the exposed corners from breakage.

3. In the method of fabricating laminated fibrous insulation blocks, the steps consisting in superposing a plurality of self-sustaining, resilient fibrous insulating units to form a blank of approximately the desired final thickness and general geometrical outline, placing said units under compression sufficient to cause adjacent faces of the units to contact with one another throughout substantially their entire surface area, maintaining said units under compression while adhesively securing thin, flexible, readily severable sheet material to sufficient of the periphery of said blank to maintain said insulating units as a block upon subsequent fabrication, releasing said pressure, cutting away portions of said blank and reducing the blank to the desired final thickness.

4. In the method of fabricating laminated fibrous insulation blocks, the steps consisting in superposing a plurality of self-sustaining, fibrous insulating units to form a blank of substantially the desired final thickness and general geometrical outline, adhesively securing a thin, flexible, readily severable sheet material to sufficient of the periphery of said block and including the projecting corners, to maintain said insulating units as a block upon subsequent fabrication and cutting away portions of the blank and including at least a portion of the periphery thereof.

5. In the method of fabricating laminated fibrous insulation blocks, the steps consisting in superposing a plurality of self-sustaining, fibrous insulating units to form a blank of substantially the desired final thickness and general geometrical outline, securing a sheet of paper with a quick setting adhesive to sufficient of the periphery of said blank to maintain said insulating units as a block upon subsequent fabrication and cutting away portions of said blank and said paper to form an insulating block of the desired final contour, said paper maintaining the units of said completed block in fixed position.

6. In the method of fabricating laminated fibrous insulation blocks, the steps consisting in forming a blank of laminated fibrous insulating units of substantially the desired final thickness and general geometrical outline, adhesively securing a thin, flexible, readily severable sheet material to a major portion of the periphery of said blank to maintain said insulating units as a block upon subsequent fabrication and cutting away portions of the periphery of said blank and said securing sheet material to form a block of substantially the desired final shape and reducing the blank to substantially the desired final thickness, the remaining sheet material maintaining the units of said completed block in rigid and fixed position.

7. In the method of fabricating laminated fibrous insulation blocks, the steps consisting in superposing a plurality of self-sustaining, resilient fibrous insulating units, placing said units under compression sufficient to cause the adjacent faces of the units to contact with one another throughout substantially their entire surface area, whereby channels for the direct transmission of heat are eliminated and the compacted blank presents a substantially continuous flat surface on its periphery for the reception of securing means, maintaining said units under compression while adhesively securing thin, flexible sheet material to a portion at least of the periphery of said compacted units and thereafter releasing said pressure.

8. In the method of fabricating laminated fibrous insulation blocks, the steps consisting in building up a blank of insulating units, the outermost units being relatively more dense than the inner units, placing said units under compression sufficient to cause the adjacent faces of the units to contact with one another throughout substantially their entire surface area, whereby channels for the direct transmission of heat are eliminated and the compacted blank presents a substantially continuous flat surface on its periphery for the reception of securing means, maintaining said units under compression while adhesively securing thin, flexible, readily severable sheet material to a portion at least of the periphery of said compacted units, thereafter releasing said pressure and removing portions of said blank.

9. As a new article of manufacture, a blank for fabrication into an insulation block comprising a plurality of self-sustaining, resilient fibrous insulating units having their adjacent faces in contact with one another throughout substantially their entire surface area, whereby channels for the direct transmission of heat are eliminated and the blank presents a substantially continuous flat surface on its periphery and thin, flexible sheet material adhesively secured to a portion at least of the periphery of said blank, said sheet material serving to maintain said blank as a rigid structure to permit subsequent fabrication.

10. As a new article of manufacture, a blank for fabrication into an insulation block comprising a plurality of self-sustaining, resilient fibrous insulating units having their adjacent faces in contact with one another throughout substantially their entire surface area, whereby channels for the direct transmission of heat are eliminated and the blank presents a substantially continuous flat surface on its periphery and thin, flexible, readily severable sheet material adhesively secured to a portion at least of the periphery of said blank, said sheet material serving to maintain said blank as a rigid structure to permit subsequent fabrication.

11. As a new article of manufacture, a blank for fabrication into an insulation block comprising a plurality of superposed, self-sustaining, resilient fibrous insulating units of regular geometrical outline, said units having their adjacent faces in contact with one another throughout substantially their entire surface area, and a thin, flexible sheet material adhesively secured to the periphery of said units and constituting the sole means of securing said units in a rigid structure.

12. As a new article of manufacture, an insulation block comprising a plurality of superposed, self-sustaining, resilient fibrous insulating units having their adjacent faces in contact with one another over substantially their entire surface area, said units being held in fixed and rigid relationship by means of a sheet of thin, flexible, readily severable material adhesively secured to a portion only of the periphery of said block, said block being provided with a complex contour and said sheet material being secured only to that portion of the block which is of regular geometrical contour.

13. As a new article of manufacture, an insulation block comprising a plurality of superposed, self-sustaining, resilient fibrous insulating units having their adjacent faces in contact with one another over substantially their entire surface area, said units being held in fixed and rigid relationship by means of a sheet of thin, flexible, readily severable material adhesively secured only to the periphery of said block, an exposed face of said block being free of said securing strip.

14. As a new article of manufacture, an insulation block of thickness greater than one inch comprising a plurality of superposed, self-sustaining, resilient, fibrous insulating units having their adjacent faces in contact with one another over substantially their entire surface area, said block having a complex peripheral contour with the edges of the units terminating in the periphery of the block, and thin, flexible, readily severable sheet material adhesively secured to at least a portion of the edges of the units which are of regular geometrical contour to hold the individual units in fixed and rigid relationship as an insulation block.

15. As a new article of manufacture, an insulation block of thickness greater than one inch comprising a plurality of superposed, self-sustaining, resilient, fibrous insulating units having their adjacent faces in contact with one another over substantially their entire surface area, the edges of the units terminating in the periphery of the block, and thin, flexible, sheet material adhesively secured to a portion of the periphery only of each unit to hold the individual units in fixed and rigid relationship as an insulation block.

LESTER E. COVER.